US011513042B2

(12) United States Patent
LeMay et al.

(10) Patent No.: US 11,513,042 B2
(45) Date of Patent: Nov. 29, 2022

(54) POWER-COMPENSATED FUSION FURNACE

(71) Applicant: SPEX Sample Prep LLC, Metuchen, NJ (US)

(72) Inventors: Pierre-Emmanuel LeMay, Quebec (CA); Marc Boivin, Wendake (CA)

(73) Assignee: SPEX SamplePrep, LLC, Metuchen, NJ (US)

(*) Notice: Subject to any disclaimer, the term of this patent is extended or adjusted under 35 U.S.C. 154(b) by 1232 days.

(21) Appl. No.: 14/604,887

(22) Filed: Jan. 26, 2015

(65) Prior Publication Data
US 2016/0216180 A1 Jul. 28, 2016

(51) Int. Cl.
H05B 1/02 (2006.01)
G01N 1/44 (2006.01)
F27B 17/02 (2006.01)
H05B 6/06 (2006.01)
B01L 7/00 (2006.01)

(52) U.S. Cl.
CPC ............ G01N 1/44 (2013.01); B01L 7/00 (2013.01); F27B 17/02 (2013.01); H05B 1/0247 (2013.01); H05B 6/06 (2013.01); B01L 2200/147 (2013.01); B01L 2200/148 (2013.01); B01L 2300/024 (2013.01); B01L 2300/1827 (2013.01)

(58) Field of Classification Search
None
See application file for complete search history.

(56) References Cited

U.S. PATENT DOCUMENTS

| 3,735,253 | A | * | 5/1973 | Seger | G01N 27/041 324/717 |
| 3,842,724 | A | * | 10/1974 | Korr | A23L 3/005 219/489 |
| 3,868,492 | A | * | 2/1975 | Taylor | B60S 1/586 15/250.05 |
| 3,899,627 | A | * | 8/1975 | Sitek | B01L 3/04 219/427 |
| 3,919,523 | A | * | 11/1975 | Wadia | A47J 37/1266 219/441 |
| 3,924,102 | A | * | 12/1975 | Hanekom | G05D 23/2401 219/497 |

(Continued)

OTHER PUBLICATIONS

"Non-Final Office Action", U.S. Appl. No. 14/604,947, dated May 30, 2017, 16 pp.

(Continued)

Primary Examiner — Ibrahime A Abraham
Assistant Examiner — Gyounghyun Bae
(74) Attorney, Agent, or Firm — ArentFox Schiff LLP

(57) ABSTRACT

A power-compensated fusion furnace includes a power control system having one switching device per heating element, power measurement circuitry, a master temperature sensor, and a controller. Each switching device is electrically connected to a respective heating element. The controller, in conjunction with the switching devices, is able to individually control the electrical energy flowing to each heating element, thereby controlling the duty cycle of each heating element. The duty cycles are corrected for one or more of: variations in the electrical resistance of each heating element and position-dependent variations in furnace cavity temperature.

23 Claims, 10 Drawing Sheets

(56) References Cited

U.S. PATENT DOCUMENTS

| | | | |
|---|---|---|---|
| 4,146,770 A * | 3/1979 | Dinsdale | B23H 1/02 219/69.13 |
| 4,241,288 A * | 12/1980 | Aoshima | A47J 27/62 219/432 |
| 4,276,603 A * | 6/1981 | Beck | F23N 5/203 700/209 |
| 4,338,769 A | 7/1982 | Jones | |
| 4,388,722 A * | 6/1983 | Tanimoto | B08B 1/04 219/427 |
| 4,506,144 A | 3/1985 | Hesford et al. | |
| 4,522,788 A * | 6/1985 | Sitek | G01N 5/00 177/50 |
| 4,573,058 A * | 2/1986 | Brooks | B41J 2/355 219/497 |
| 4,574,185 A * | 3/1986 | Wenger | A47J 37/1266 219/441 |
| 4,793,844 A * | 12/1988 | Panayotov | C03B 19/02 65/136.4 |
| 4,900,900 A * | 2/1990 | Shirae | F27D 19/00 219/483 |
| 4,902,877 A * | 2/1990 | Grasso | F24C 15/106 219/483 |
| 5,302,809 A * | 4/1994 | Ghiassy | H05B 3/845 219/219 |
| 5,315,091 A * | 5/1994 | O'Brien | F27B 17/02 164/136 |
| 5,436,788 A * | 7/1995 | Wallaert | H02J 13/0048 307/38 |
| 5,442,515 A * | 8/1995 | Wallaert | H01F 7/1805 123/490 |
| 5,698,158 A * | 12/1997 | Lam | B01D 3/42 266/87 |
| 5,786,837 A | 7/1998 | Kaerts et al. | |
| 5,790,750 A * | 8/1998 | Anderson | C23C 16/481 118/725 |
| 5,994,675 A * | 11/1999 | Bethune | H01L 21/67103 118/724 |
| 6,043,465 A | 3/2000 | Andersen et al. | |
| 6,172,346 B1 * | 1/2001 | Wroe | B01J 19/126 219/681 |
| 6,211,495 B1 * | 4/2001 | Stoddard | F27D 21/0014 219/497 |
| 6,229,120 B1 * | 5/2001 | Jewell | G03G 15/2003 219/216 |
| 6,270,727 B1 * | 8/2001 | Mitchell | G01N 31/12 422/557 |
| 6,291,802 B1 * | 9/2001 | Ford | F27D 1/18 219/392 |
| 6,329,643 B1 * | 12/2001 | Suzuki | C30B 25/10 219/497 |
| 6,496,749 B1 * | 12/2002 | Yamaguchi | H01L 21/67248 219/483 |
| 6,534,748 B1 * | 3/2003 | Zinman | H01L 21/326 118/50.1 |
| 6,685,295 B2 * | 2/2004 | Roman | B41J 2/175 347/14 |
| 6,911,627 B2 * | 6/2005 | Oguma | G02B 6/10 219/483 |
| 7,038,485 B2 * | 5/2006 | Nakashima | H04L 25/0278 326/16 |
| 7,619,184 B2 * | 11/2009 | Velichko | H01L 21/67248 118/725 |
| 7,668,607 B1 * | 2/2010 | Fernald | H02M 3/157 700/28 |
| 7,835,718 B2 * | 11/2010 | Oba | H04B 1/28 455/343.1 |
| 8,378,272 B2 * | 2/2013 | Shigetomi | H01L 21/67748 219/494 |
| 9,781,774 B1 * | 10/2017 | Boivin | H05B 3/62 |
| 2004/0099653 A1 | 5/2004 | Hirayama et al. | |
| 2004/0173142 A1 * | 9/2004 | Willis | F27B 14/00 117/200 |
| 2004/0245236 A1 * | 12/2004 | Cook | H05B 1/0205 219/216 |
| 2004/0256378 A1 * | 12/2004 | Shukla | F24C 7/082 219/490 |
| 2005/0213280 A1 * | 9/2005 | Azrai | H01L 23/5223 361/271 |
| 2007/0235231 A1 * | 10/2007 | Loomis | G01L 1/205 178/18.06 |
| 2008/0156789 A1 * | 7/2008 | Devey | B23K 1/018 219/444.1 |
| 2009/0219968 A1 | 9/2009 | Perry et al. | |
| 2010/0187218 A1 * | 7/2010 | Naydenov | B01D 53/9431 219/483 |
| 2011/0199224 A1 * | 8/2011 | Tatsumi | H01L 22/34 340/638 |
| 2011/0248017 A1 * | 10/2011 | Etscheid | F16L 53/008 219/492 |
| 2012/0048467 A1 * | 3/2012 | Mahadeswaraswamy | H01J 37/32522 156/345.27 |
| 2012/0048843 A1 * | 3/2012 | Feng | A47J 27/004 219/442 |
| 2012/0213244 A1 * | 8/2012 | Latino | H05B 3/62 373/118 |
| 2012/0245878 A1 | 9/2012 | Kane et al. | |
| 2014/0153606 A1 * | 6/2014 | Walker | F27B 17/02 373/135 |
| 2014/0197151 A1 * | 7/2014 | Volfovski | H05B 3/26 219/448.11 |
| 2014/0238972 A1 * | 8/2014 | Yoshii | F27B 17/0025 219/486 |
| 2015/0215992 A1 * | 7/2015 | Lopez Rodriguez | B41J 11/002 219/486 |

OTHER PUBLICATIONS

"Office Action" issued in related U.S. Appl. No. 14/604,947, dated May 11, 2018; pp. 19.

"Office Action" issued in related U.S. Appl. No. 14/604,947, dated Dec. 26, 2017; pp. 20.

\* cited by examiner

POWER-COMPENSATED FUSION FURNACE

FIELD OF THE INVENTION

The present invention relates generally to the preparation of inorganic samples by fusion, and more particularly to a system and methods for doing so.

BACKGROUND

Analyzing an inorganic sample via analytical techniques such as x-ray fluorescence (XRF), inductively coupled plasma (ICP), atomic absorption (AA) requires that the sample be specially prepared before analysis. The sample must often be in the form of a homogeneous, solid, smooth-surface shape, such as that of a disk or bead. In this form, the sample does not exhibit mineralogical, grain-size, or orientation effects that might otherwise skew the analytical results.

A process known as "fusion" can be used to prepare samples for XRF, ICP, and AA. During the fusion process, a powdered sample is dissolved in a solvent, typically a lithium borate flux. The flux is solid at room temperature and must therefore be liquefied, which typically occurs at high temperature (c.a. 900 to 1000° C.). After complete dissolution of the sample, the molten solution is poured into a plate-shaped platinum mold. Cooling results in a small, homogeneous glass-like disk or bead of sample, now suitable for analysis.

As a consequence of the high temperatures required, the fusion process is performed in a heater. Energy for the process is supplied either by gas (i.e., a gas heater) or electricity (i.e., an electric furnace). Electrically powered furnaces can be inductive or resistive. Resistive furnaces offer the best temperature stability and accuracy.

FIG. 1 depicts the salient elements of prior-art resistive fusion furnace 100. Furnace 100 comprises inner walls 102, door 104, heating elements 110 (only one is visible in the view shown), and power control system 112. Inner walls 102 define furnace cavity 106. Power control system 112 includes temperature sensor 114, controller 116, and switching device 118.

A "platinumware" assembly (not depicted) is used in conjunction with furnace 100. The platinumware assembly includes a crucible holder, which supports a plurality of platinum crucibles, and a mold rack, which supports a like number of platinum molds. The assembly is arranged to slide in and out of furnace cavity 106. Once the flux and sample are deposited into the crucibles, the assembly is moved into cavity 106 and door 104 closes to begin the fusion process. See, e.g., http://www.katanax.com/cgi/show-.cgi?products/K2prime/K2primevideo.I=en.html.

Furnace 100 includes a plurality of heating elements 110. In the embodiment depicted in FIG. 1, heating elements 110 are arranged vertically along the back wall of inner cavity 106. The heating elements are typically arranged in arrays (e.g., 3×1, 5×1, etc.). Although arranged vertically in FIG. 1, in some other embodiments, the heating elements are arrayed transversely. Also, in some other embodiments, rather than being arrayed against the back wall of the inner cavity, the heating elements can be disposed along the upper and/or lower wall of furnace 100, in either a front-to-back or transverse orientation. Electrical leads of each heating element 110 electrically couple it to a source of electrical energy.

The temperature of each heating element rises as electrical energy is delivered thereto. The heating elements comprise an electrically resistive filament capable of tolerating high (typically up to at least 1200° C.) temperatures. The resistive material can be, for example, and without limitation, tungsten, molybdenum, tantalum, niobium, rhenium, osmium, carbon, or any combination thereof; it can also be a compound such as silicon carbide (SiC), silicon nitride ($Si_3N_4$), molybdenum disilicide ($MoSi_2$), or other alloys, such as iron-chromium-aluminum (FeCrAl).

Any gas that is produced during the fusion process is exhausted through vent 108. Furnace 100 often includes cooling capability, such as a fan (not depicted), to prevent the connection point of heating elements 110 (located outside of furnace inner cavity 106) from overheating.

Closed-loop feedback, as implemented by power control system 112, controls the temperature within furnace cavity 106. Temperature control by conventional power control system 112 is discussed in more detail in conjunction with FIG. 2.

FIG. 2 depicts further detail of conventional resistive fusion furnace 100; in particular, details of the power-control system 112 are shown. For pedagogical purposes, furnace 100 is depicted as having five heating elements 210A, 210B, 210C, 210D, and 210E (collectively, heating elements 210), although furnaces with fewer or greater numbers of heating elements are commonly commercially available.

In the typical implementation of power control system 112 depicted in FIG. 2, temperature sensor 114 is embodied as thermocouple 214 and switching device 118 is implemented as switch 218. Electrical energy from an energy source (not depicted) is delivered through switch 218 to heating elements 210. Controller 116 controls the electrical energy flowing to heating elements 210 by opening and closing switch 218. Typically, controller 116 causes switch 218 to close when the temperature measured by thermocouple 214 falls below a desired operating temperature (i.e., set-point temperature), and to open when the temperature measured by thermocouple 214 rises above the set-point temperature. Other methods for controller 116 to control the open-or-closed state of switch 218 are well known in the art.

Typically, furnace 100 is designed such that, when switch 218 is closed, heating elements 210 receive sufficient electrical energy to ensure that the temperature in furnace cavity 106 will reach any desired set-point temperature. To maintain the temperature in the cavity near the set-point temperature, controller 116 implements a feedback control loop by appropriately cycling switch 218 "on" and "off" as described in the previous paragraph. This basic form of temperature control is essentially the same as employed in a simple home thermostat.

There are inherent manufacturing variations in heating elements, such as heating elements 210A, 210B, 210C, 210D, and 210E. For example, depending on the material and manufacturing process, a given heating element will have an actual electrical resistance that can vary significantly (up to +/−20%) from the nominal value. Thus, even if heating elements 210 are all specified to have a nominal power rating of 800 watts at a specified nominal voltage and temperature, some of them might receive an amount of power as low as about 640 watts while others receive an amount of power as high as about 960 watts, when connected to the nominal voltage at the nominal temperature. This means that some heating elements will heat to a significantly higher temperature than other heating elements. The disparity between heating elements might even be worse at voltages and temperatures other than the nominal.

As a consequence, even if controller 116 is able to maintain an average cavity temperature, as measured by thermocouple 214, close to the set-point, the temperature profile across furnace cavity 106 is likely to vary significantly.

In addition to the aforementioned manufacturing variations, heat loss through the furnace walls 102 affects the temperature profile in furnace cavity 106. In particular, even with transversely (i.e., left-to-right) oriented heating elements in a closed furnace, the left- and right-most positions within furnace cavity 106 are likely to be somewhat cooler than the center positions. And the center position is likely to be hotter than all other positions. This results in a temperature profile that peaks toward the center of the furnace cavity.

This position-based temperature profile is likely to exacerbate temperature variations that result from the aforementioned manufacturing variations in heating elements 210. The temperatures across furnace cavity 106 are therefore likely to vary significantly because of these issues, which can ultimately bias the final analytical result due to inconsistent reaction or evaporation of the prepared sample.

SUMMARY

The present invention provides a way to economically address both of the aforementioned issues to improve temperature uniformity in a resistive fusion furnace. This is accomplished by active power control and compensation, as implemented by a novel power control system.

In some embodiments, the power control system includes one switching device per heating element, power-measurement circuitry, a master temperature sensor, and a controller. Each switching device is wired to a respective heating element. The controller, in conjunction with the switching devices, is able to individually control the electrical energy flowing to each heating element by operating the associated switching device in accordance with a duty cycle.

To account for the variations in electrical resistance of the heating elements, measurements suitable for calculating the power delivered to the heating elements are obtained by the power measurement circuitry. The measured power is used to develop a correction for duty cycle of each heating element. In some embodiments, the relationship between power and duty cycle is treated as being linear; in some other embodiments, the relationship is treated as being non-linear. Either approach is acceptable for use in conjunction with embodiments of the present invention. The linear relationship ignores the time-dependent relationship between duty cycle, power, electrical resistance of the heating elements, and temperature, which is fairly complex to model. For the non-linear approach, mathematical expressions (e.g., polynomials, etc.) or a look-up table that relates measured power to duty cycle for each heating element is developed. Regardless of approach, the relationship between duty cycle and power, which provides "heating-element calibration data," is stored in memory that is accessible to the controller.

In the prior art, heating elements are turned "on" or "off" by controller 116, typically in response to an indication that the temperature in the furnace is below or above a set point temperature. When a heating element is turned "on," it receives an amount of electrical power that is determined by its electrical resistance and the applied voltage. The controller cannot change this power level. In contrast, in embodiments of the present invention, the controller can perform individual power-level adjustments for each heating element by controlling its duty cycle. Power level can be adjusted to any value between zero and the full power that the heating element would receive in a prior-art furnace.

In some embodiments of the present invention, the power level that is optimal for the heating elements to readily achieve a desired (set-point) temperature (e.g., 1050° C., etc.) is established (e.g., based on previous experience, operator input, etc.). The duty cycle required for each heating element (to achieve the power level) is then determined from the heating-element calibration data. These duty cycles are referred to herein as the "calibrated duty cycles." Thereafter, if and when the furnace cavity temperature rises above the set point, the heating elements are turned "off," as in the prior art. However, in contrast with the prior art, when the cavity temperature is lower than the set point, the heating elements are turned on each according to its own calibrated duty cycle. This way, the same amount of (average) electrical power is delivered to each element.

To account for position-dependent temperature variations in the furnace cavity, a particular furnace or furnace design is tested prior to actual use. As part of the testing, temperature measurements are obtained proximal to each heating element (and preferably at the location of the nearest crucible), wherein the elements are operating at the calibrated duty cycles. A correction factor for each heating element can then be generated by calculating the ratio of the desired (set-point) temperature to the measured temperature near the heating element (crucible). A corrected, calibrated duty cycle is calculated for each heating element by multiplying the calibrated duty cycle by this correction factor. The corrected, calibrated duty cycle is used during normal furnace operation.

In accordance with the present teachings, the operating duty cycle for the heating elements can be based on: (i) heating-element calibration data; or (ii) corrections for position-dependent temperature variations; or (iii) both (i) and (ii). Power control systems in accordance with the present teachings differ from those used in prior-art fusion furnaces in at least the following respects:

In prior-art power control systems, a single switch is typically turned "on" or "off" to enable or disable the flow of electrical energy to a plurality of heating elements, with no adjustment of power flow. In the illustrative embodiment, one switching device is used per heating element, wherein each switching device is wired and controlled to continuously adjust the average flow of energy to a respective heating element such that a range of power-flow values are possible through adjustment of a duty cycle.

In prior-art systems, there is no ability to measure the power delivered to each heating element.

In prior-art systems, no calibration of heating elements to account for variations in electrical resistance is performed, nor does the controller access any such information to control the flow of electrical energy to the heating elements.

In prior-art systems, no correction for position-dependent temperature variations is performed, nor does the controller access any such information to control the flow of electrical energy to the heating elements.

Some embodiments of the invention provide a power-compensated fusion furnace comprising: a furnace cavity; a plurality of heating elements disposed in the furnace cavity; and a power control system that individually controls the duty cycle of each of the heating elements.

Some embodiments of the invention provide a power-compensated fusion furnace comprising: a furnace cavity; a plurality of heating elements disposed in the furnace cavity; and a plurality of switching devices, wherein each switching device controls a flow of electrical energy to a respective one of the heating elements, and wherein each switching device and associated heating element are arranged in parallel with respect to other pairs of switching devices and associated heating elements.

Some embodiments of the invention provide a power-compensated fusion furnace comprising: a furnace cavity; a plurality of heating elements disposed in the furnace cavity; a plurality of switching devices, each of which controls a flow of electrical energy to a respective one of the heating elements; power measurement circuitry that obtains measurements for calculating power delivered to each heating element, wherein measurements are used to establish a relationship, for each heating element, between duty cycle of the heating element and measured power received thereby; and a controller that generates control signals for individually controlling the switching devices, thereby individually controlling a duty cycle of each heating element, wherein the control signals are based, at least in part, on calibrated duty cycles obtained from the relationship between duty cycle and measured power for each heating element.

An aspect of the present disclosure includes a power control system that independently controls an electrical duty cycle of each of the plurality of electrical heating elements to account for the different electrical resistance thereof by turning the electrical heating elements on and off such that, on average, each of the electrical heating elements receives the same average amount of power, and, wherein the electrical duty cycle of at least one electrical heating element in the plurality thereof differs from the electrical duty cycle of other electrical heating elements in the plurality.

DETAILED DESCRIPTION

Figure 3:
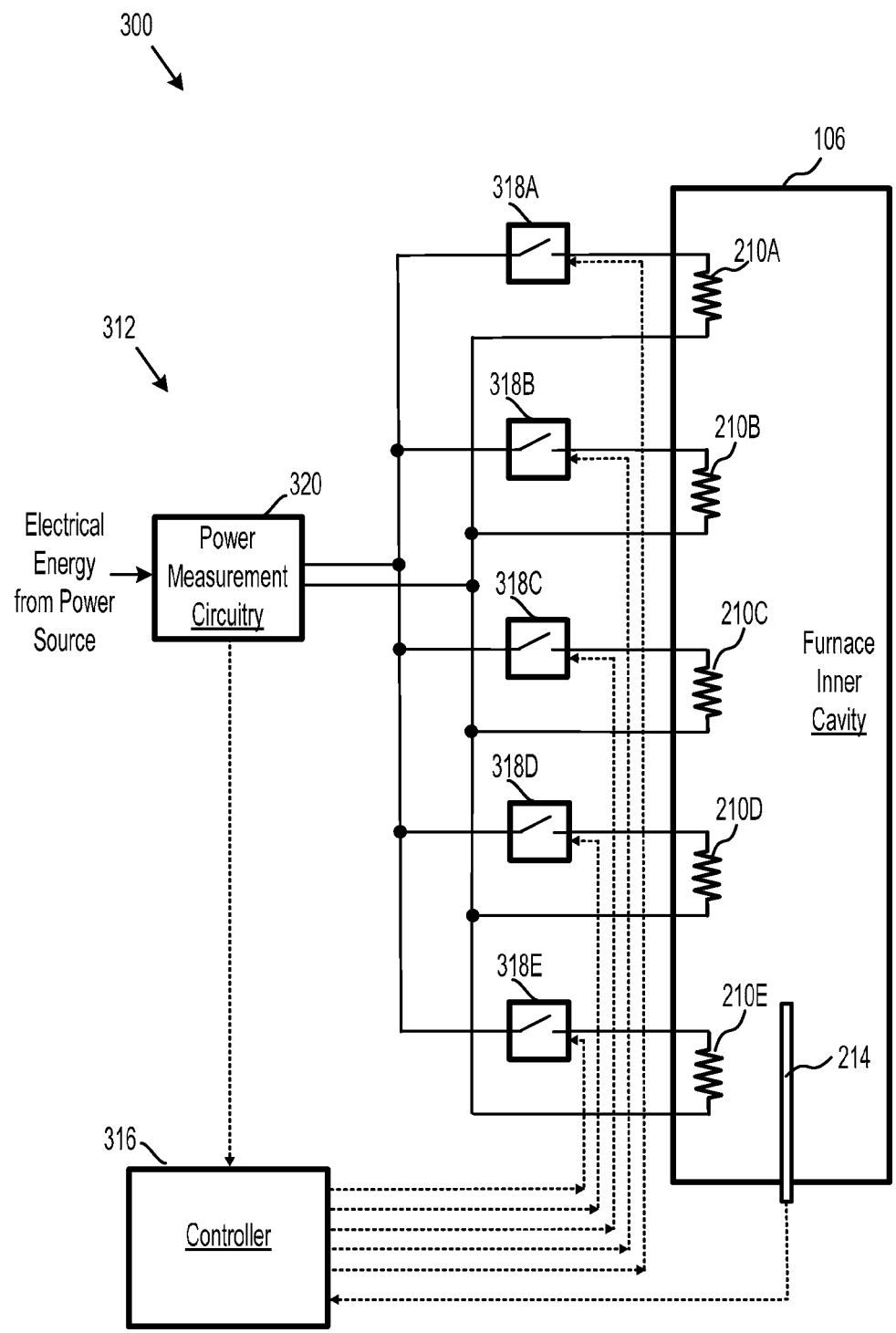
FIG. 3 depicts a fusion furnace incorporating a power control system in accordance with the illustrative embodiment of the present invention.

FIG. 3 depicts selected elements of fusion furnace 300, including furnace cavity 106 having five heating elements 210A, 210B, 210C, 210D, 210E (collectively heating elements 210) and power control system 312 in accordance with the illustrative embodiment of the present invention.

Figure 1:
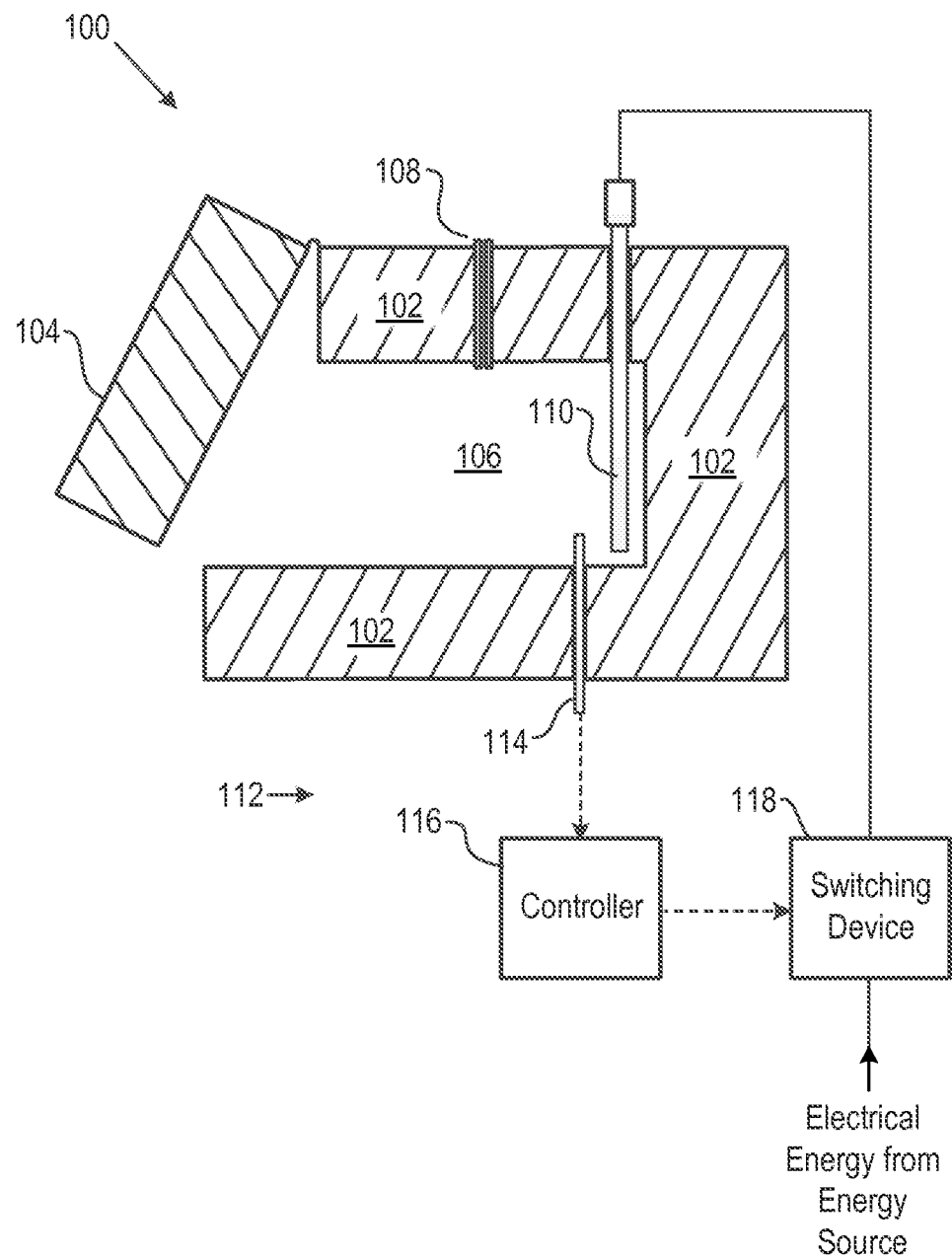
FIG. 1 depicts a conventional fusion furnace.
Figure 2:
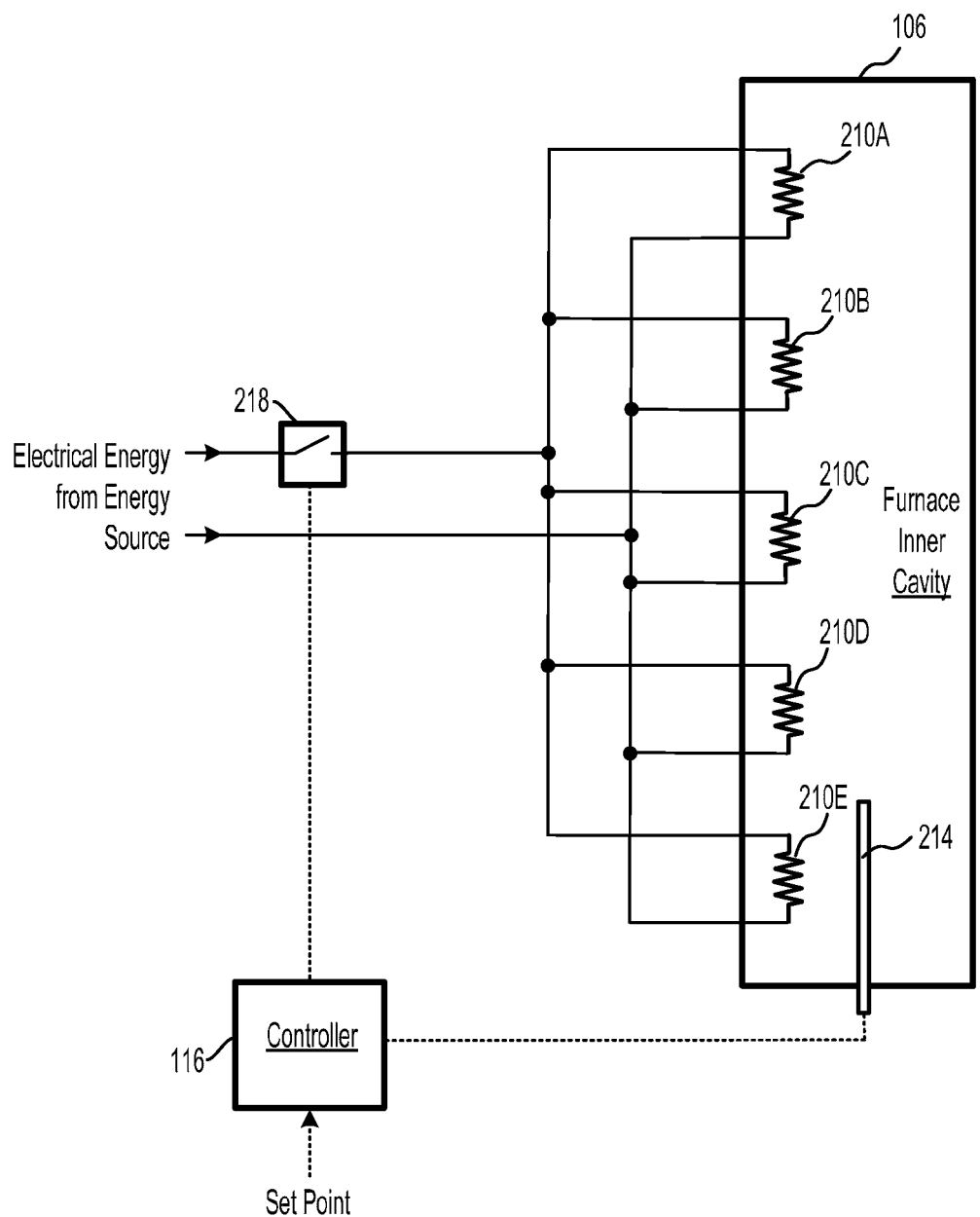
FIG. 2 depicts further detail of the power control system of the conventional fusion furnace of FIG. 1.

Heating elements 210 are conventional and are consistent with those described above in conjunction with FIGS. 1 and 2. Although five heating elements 210 are depicted in cavity 106 of furnace 300, some other embodiments of the furnace can include fewer or more such heating elements. The energy source that delivers the energy to heating elements 210 can be a source of AC power, such as 120v or 240v as delivered from a wall outlet, or DC power, as delivered from a power supply.

Power control system 312 receives electrical energy from the energy source and controls the average amount of energy flowing to, and hence the average power received by, heating elements 210. As discussed further below, power control system 312 differs from prior-art power control system 112 in terms of componentry, the layout thereof, and the information that is available to and used by the system controller.

In the illustrative embodiment, power control system 312 includes a plurality of switching devices—one for each heating element 210—as well as a single master temperature sensor for monitoring the temperature in cavity 106. Power control system 312 also includes controller 316, and power measurement circuitry 320. In the illustrative embodiment, the switching devices, controller, temperature sensor, and measurement circuitry are interconnected and arranged as shown in FIG. 3.

In the illustrative embodiment, the switching devices are implemented as switches 318A, 318B, 318C, 318D, and 318E (collectively switches 318). As noted above, switches 318 control (i.e., "on" or "off") the electrical energy flowing to heating elements 210. Switches are conventional switching devices, such as relays, solid state switches, SCRs, TRIACs, etc.

In the illustrative embodiment, furnace cavity 106 includes a single, fixed-location temperature sensor, which is embodied as thermocouple 214. This thermocouple measures the temperature in furnace cavity 106 and generates a signal (e.g., voltage, current, etc.) indicative thereof for use in a temperature control loop. Since the thermocouple will be measuring temperatures as high as about 1200° C., it must be of a type that can withstand and accurately measure such high temperatures. Suitable thermocouples for this service include B, K, R, or S type thermocouples. It is within the capability of those skilled in the art to select a temperature sensing device suitable for this service.

Controller 316, in conjunction with final control elements (i.e., switches 318) and thermocouple 214, implements a control loop (e.g., feedback, etc.) by which the temperature of the fusion furnace is automatically controlled to a set-point temperature.

In the illustrative embodiment, controller 316 comprises a microcontroller (i.e., a chip with a CPU, RAM for data storage and ROM/EPROM/EEPROM or flash memory for program storage, i/o ports, etc.). In some other embodiments, controller 316 comprises a microprocessor and necessary peripherals (processor-accessible storage, i/o, etc.). In both cases, non-volatile, non-transitory memory technology is present for storing software, etc. In some embodiments, controller 316 is a PID (proportional-integral-derivative) controller.

In addition to any other capabilities, controller 316 is capable of providing the following functionality via its programming and the information accessible thereto:
  (i) Ramping furnace temperature as a function of sample type and/or flux type;

(ii) Receiving and storing a temperature measurement from the master temperature sensor;

(iii) Accepting a set-point temperature from a pre-programmed routine or a user;

(iv) Calculating an offset temperature (a difference between the measured temperature in the furnace inner cavity and the set-point temperature); and (v) Independently controlling switches 318 to individually adjust the average power delivered to heating elements 210 for the purpose of precisely controlling the temperature of furnace cavity 106. This functionality is an important aspect of the present invention and is discussed in further detail later in this Specification.

Power measurement circuitry 320 is able, in conjunction with switches 318 and controller 316, to acquire the information required to determine the power that is delivered to each heating element 210.

In embodiments in which the energy source delivers direct current, power measurement circuitry 320 measures voltage drop (V) and current (I). In such embodiments, power (P) is the product of voltage and current; that is, P=V×I. For embodiments in which the energy source delivers single-phase alternating current, then power measurement circuitry 320 measures voltage drop, current, and the phase angle (θ) between the voltage and the current. For these embodiments, power is the product of voltage, current, and the cosine of the phase angle; that is, P=V×I×cos θ. In most cases, the phase angle is near 0° for resistive heating elements. Such measurements, and circuits for obtaining them, are well known to those skilled in the art.

In some embodiments, power measurement circuitry 320 is discretely packaged and is removable from power control system 312. For such embodiments, power measurement circuitry 320 is typically used at the time of manufacture to obtain the aforementioned measurements. In those embodiments, to obtain the requisite measurements, power measurement circuitry 320 is electrically coupled to the power source, controller 316, and the plurality of switches 318. Electrical energy is allowed to flow and the measurements are obtained, as described in further detail later in this Specification. After the measurements are obtained, power measurement circuitry 320 is removed from power control system 312 of the particular furnace and is then electrically connected to the power control system of another fusion furnace, etc. This approach provides a relatively lower cost fusion furnace since, as sold to end users, the furnace will not include power measurement circuitry 320. In such embodiments, it may be necessary recouple power measurement circuitry 320 to the system, for example, when one of the heating elements is replaced. Alternatively, the new heating element might be characterized in the factory, and shipped to the end user along with power measurement results to be provided to controller 316.

In some other embodiments, power measurement circuitry 320 is fully integrated into power control system 312 and is not removable. In such embodiments, the required measurements can be obtained either during the time of manufacture or in the field, such as by end-users. For embodiments in which power measurement circuitry 320 is fully integrated, measurements to determine the power received by the heating elements can be taken on regular basis, as convenient, to account for aging of heating elements 210, etc. In fact, these readings can be obtained as frequently as every few seconds; that is, on an essentially continuous basis.

Figure 4:
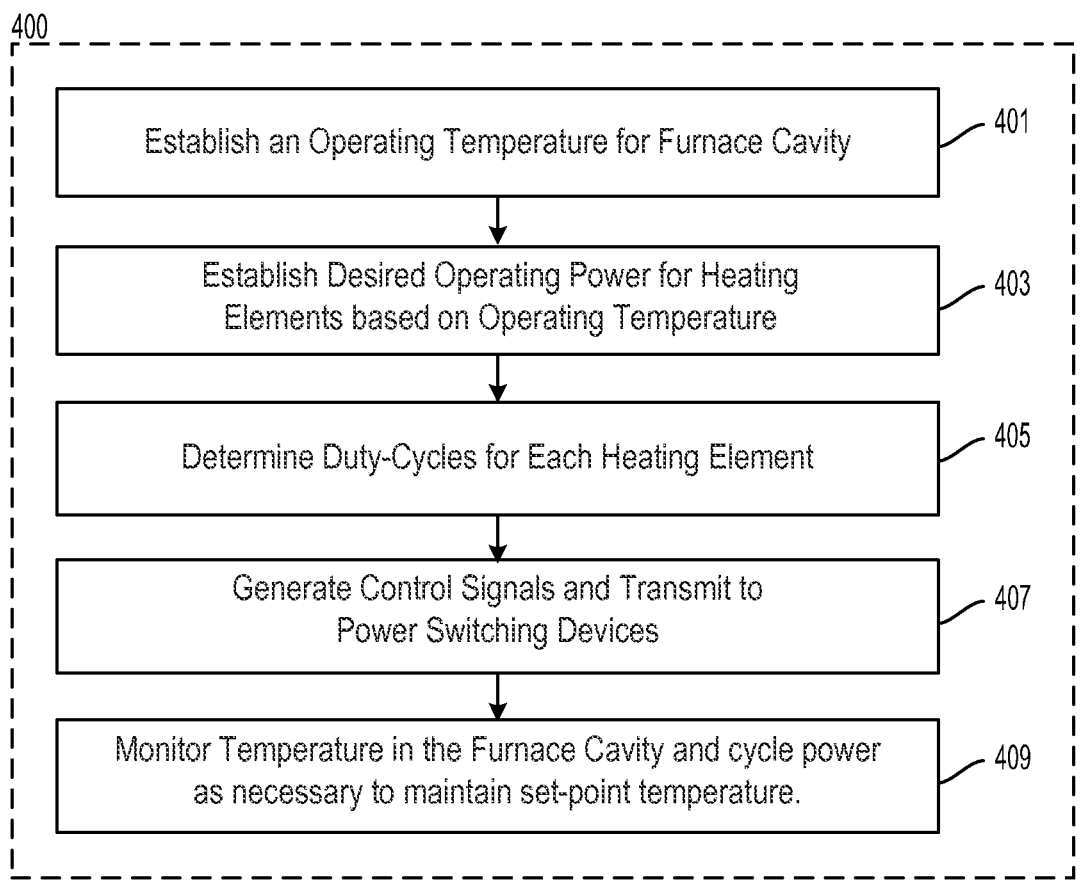
FIG. 4 depicts a method for operating a fusion furnace in accordance with the illustrative embodiment of the present invention.

FIG. 4 depicts method 400 for operating a fusion furnace. The method is discussed in conjunction with the furnace depicted in FIG. 3.

In accordance with operation 401, controller 316 establishes a desired operating temperature for furnace cavity 106. This temperature is based on the flux that is used for creating the sample. In some embodiments, a user simply selects a pre-programmed routine (i.e., intended for use with the particular flux), wherein the routine specifies the operating temperature. In some other embodiments, a user inputs a desired operating temperature. This desired temperature becomes the set-point temperature for feedback control.

Per operation 403, controller 316 establishes a power level for heating elements 210A through 210E, based on the desired operating temperature. The power level can be specified by the pre-programmed routine selected by the user. In some other embodiments, a user inputs a power level based on past experience, or a handbook, or manufacturer's recommendations, etc. As discussed further below, a desired power level is achieved by controlling the duty cycle of heating elements 210A through 210E. The duty cycle of each heating element is individually controlled, e.g., via switches 318A through 318E.

In accordance with operation 405, once the desired power level is established, controller 316 determines what the duty cycle should be for each heating element to achieve the desired power level. In accordance with the illustrative embodiment, the determination of duty cycle considers at least one of, and preferably both of: (i) manufacturing variations in the heating elements and (ii) position-dependent temperature variations within furnace cavity 106. This determination is based on empirically determined relationships, the development and application of which are important aspects of the present invention and are described in further detail below in conjunction with FIGS. 5 through 7.

At operation 407, controller 316 generates control signals that, in the illustrative embodiment, are transmitted to and control the operation of switches 318. The control signals cause the switches 318A through 318E to cycle as required to implement the duty cycles of respective heating elements 210A through 210E, as determined in operation 405.

For example, if switches 318A 318B, and 318C must be cycled at duty cycles of 30%, 42%, and 48%, respectively, such cycling can be accomplished by the following tasks:
1. Start a counter that counts from 1 to 100 at a predetermined rate (e.g., one count per 2 milliseconds, etc.). When the counter reaches 100, restart the counter at 1.
2. If the count is greater than 30, turn off switch 318A; otherwise turn it on.
3. If the count is greater than 42, turn off switch 318B; otherwise turn it on.
4. If the count is greater than 48, turn off switch 318C; otherwise turn it on.
5. Go back to task 2 and repeat forever.

It is within the capabilities of those skilled in the art to implement other procedures that will achieve the same result (i.e., cycling switches with the desired duty cycle). Such other procedures can be used in conjunction with embodiments of the present invention.

At one count per 2 milliseconds, the counter restarts itself five times per second. This rate is faster than the thermal inertia of a typical heating element; therefore, the temperature of the heating elements controlled by switches cycling at this rate can be assumed to be approximately constant and unaffected by the switch cycling. If this is not so, the counting rate of the counter can be increased as needed to make it so. Alternatively, the non-constant temperature of the heating element can be accounted for through well-known models of how the temperature of the heating element rises and falls and how the electrical resistance of a heating element changes as a function of temperature. It will be clear to those skilled in the art how to devise appropriate corrections to the desired duty cycles to account for non-constant temperature of a heating element.

With the illustrative procedure described above, all switches are turned "on" when the counter is restarted. This might be undesirable as it means that the power drawn from the power source is at a maximum at that point in time. To avoid this problem, one might use multiple counters, one for each switch, with all the counters counting independently of one another. If the independent counters are started at different times, the problem can be avoided. For example, the starting times of counters might be staggered so that they start at uniformly-distributed times.

Alternatively, different counters might count at different rates. Also, the counting rates can be changed over time in pseudo-random or truly-random patterns, so as to randomize the mutual relationships of the switching cycles. It will be clear to those skilled in the art how to implement the desired duty cycles through variations of these and other techniques that accomplish equivalent results.

In accordance with operation 409, controller 316 implements a temperature control loop wherein the temperature in the furnace cavity is monitored by thermocouple 214. In some embodiments, the power level selected in operation 403 is sufficiently high to ensure that the desired operating temperature (i.e., the set-point temperature) is reached (in a specific period of time). As the temperature of furnace cavity 106 rises above the set-point, controller 316 cuts the flow of electrical energy to heating elements 210A through 210E. This basic form of temperature control is essentially the same as employed in a simple home thermostat.

In the illustrative embodiment, there are two separate temperature-control processes taking place. One process is defined by operations 405 and 407; that is, determine the duty cycles for each heating element (based on the desired operating power established in operation 403) and generate control signals to implement the duty cycles via switching devices. This process is described in further detail below in conjunction with FIGS. 5 through 7. A second process is defined by operation 409, which is the control loop for maintaining set-point temperature.

The temperature-control process defined by operations 405 and 407 (duty-cycle operation) can be thought as occurring "within" the control loop defined by operation 409. Simply stated, the duty cycles for the heating elements, as implemented by controller 316 and switches 318A through 318E, are gated and are effectively shortened by the temperature control loop. Specifically, if the temperature in furnace cavity 106, as measured by thermocouple 214 exceeds the set-point temperature, controller 316 will prevent power for being delivered to the heating elements. This can be done in a number of ways. For example, controller 316 can cause signals to switches 318A through 318E to remain in an "open" state. Or, in embodiments in which power control system 312 includes a "master" switch (not depicted in FIG. 3; see FIG. 10) that is in series with switches 318A through 318E, controller 316 causes the master switch to open, thereby disabling the flow of power to the switches and hence to the heating elements. When the measured temperature falls below the set-point temperature, the power is restored (e.g., by resuming the cycling of switches 318A through 318E in accordance with the determined duty cycles or by closing the master switch, etc.). The interaction of the two temperature-control processes with one another is discussed in further detail in conjunction with FIGS. 8, 9A-9E, and 10.

The development and application of empirical relationships for determining the duty cycles of heating elements 210, as referenced in operation 405 of method 400, are now described.

Calibration Process for Manufacturing Variations in Heating Elements.

As previously noted, there are inherent manufacturing variations in heating elements, such as heating elements 210A, 210B, 210C, 210D, and 210E. For example, a given heating element will have an actual resistance that can vary significantly (up to +/−20%) from any other heating element. This means that some heating elements will receive significantly more power and heat to a higher temperature than other heating elements. If left uncorrected, this can substantially compromise temperature uniformity throughout the furnace cavity.

Heating elements 210A through 210E, as chosen by the manufacturer of the furnace, will typically be rated comfortably above the power required to obtain a desired operating temperature. For example, if heating elements 210A through 210E are expected (e.g., based on prior experience, etc.) to operate in the range of about 250 to 500 watts to achieve desired maximum furnace temperatures, the manufacturer might specify heating elements rated for 800 watts. In accordance with the present teachings, the power (i.e., average power) delivered to a heating element can be controlled by adjusting its duty cycle; that is, by cycling (i.e., "on" and "off") the electrical energy that is provided to the heating element. This can be done via a switching device, such as switch 318A.

Figure 6:
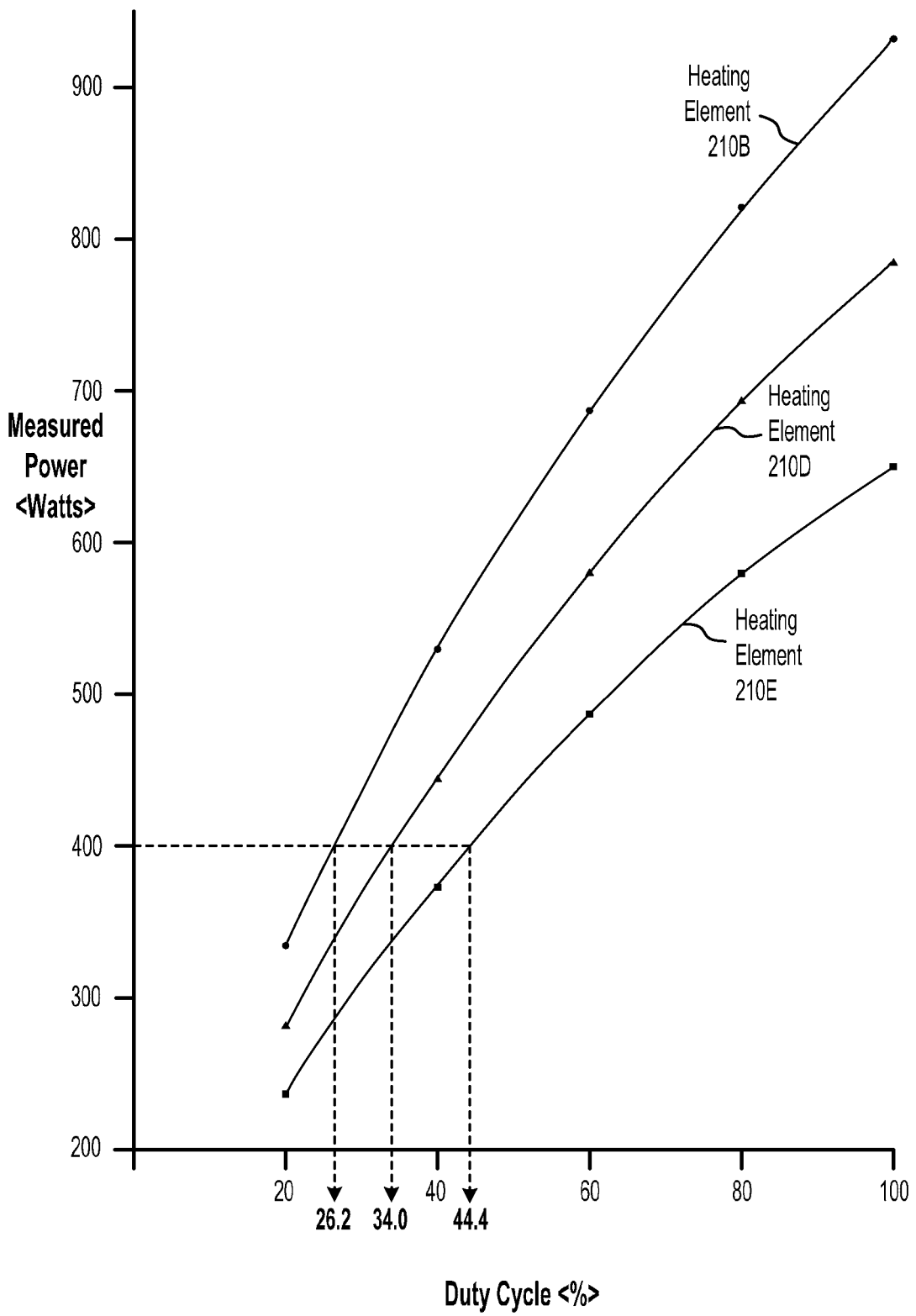
FIG. 6 depicts illustrative plots of power received vs duty cycle for heating elements of a fusion furnace.

Table I depicts how the power delivered to an on-spec (i.e., 800 watts) heating element might vary with duty cycle. These values are intended to be illustrative; they are not based on measurements or calculations. The relationship between duty cycle and power delivered to the heating element is typically not linear. This is a consequence, among any other causes, of the fact that the electrical resistance of a heating element changes (i.e., typically increases) with temperature. Thus, the duty cycle versus power relations shown in Tables I and II and FIG. 6 depict a non-linear relationship. But as discussed later in this disclosure, the relationship can, as a practical matter, be considered linear.

TABLE I

Duty Cycle vs. Power Delivered

| Duty Cycle <%> | Power Delivered to On-Spec Heating Element 210 <Watts> |
|---|---|
| 100 | 800 |
| 80 | 700 |
| 60 | 600 |
| 40 | 500 |
| 20 | 300 |

Assume that it is known that if heating elements 210A through 210E were to receive 500 Watts of power, each such heating element would optimally reach 1000° C. Table I indicates that to absorb, on average, 500 Watts of power, heating elements 210 should receive electrical energy forty percent of the time (i.e., have a 40% duty cycle). Thus, if heating elements 210 were all exactly "on-spec," they would optimally reach 1000° C. if operated at a 40 percent duty cycle.

But as previously indicated, heating elements will vary from their rated power due to the vagaries of the manufacturing process, and the variation might be as much as +/−20 percent. This means that heating elements 210, with a nominal rating of 800 watts, might actually absorb an amount of power as low as about 640 watts or as high as about 960 watts (at 100 percent duty cycle). So when controller 116 of the prior art furnace of FIG. 2 cycles switch 218 to maintain the desired set-point, heating elements 210A through 210E will not each receive exactly 500 Watts of power and furnace cavity 106 will not attain the desired uniform temperature; rather, the temperature will be higher than the set-point where heating elements are higher than the nominal rating and lower where the heating elements are lower than nominal.

In accordance with the illustrative embodiment of the present invention, and as facilitated by the use of multiple switching devices (rather than a single switch 218 as in the prior art), "calibration data" is generated for each heating element 210. The calibration data, which corrects for variations in heating-element electrical resistance, provides individual heater-element duty cycle as a function of received power. This data, in conjunction with an ability to individually control electrical energy delivered to each heating element 210, enables more uniform temperature control of furnace cavity 106 than prior-art systems. As used in this disclosure and the appended claims, the phrase "heating-element calibration data" means information that provides individual heater-element duty cycle as a function of measured power (for embodiments considering a non-linear relationship) that can be used to account for and correct variations in individual heating-element electrical resistance. For embodiments based on a linear relationship, the heating-element calibration data is simply a (different) ratio for each heating element.

The process for obtaining heating-element calibration data, when the duty cycle vs power relationship is treated as being non-linear, is described below with respect to FIGS. 5 and 6.

Figure 5:
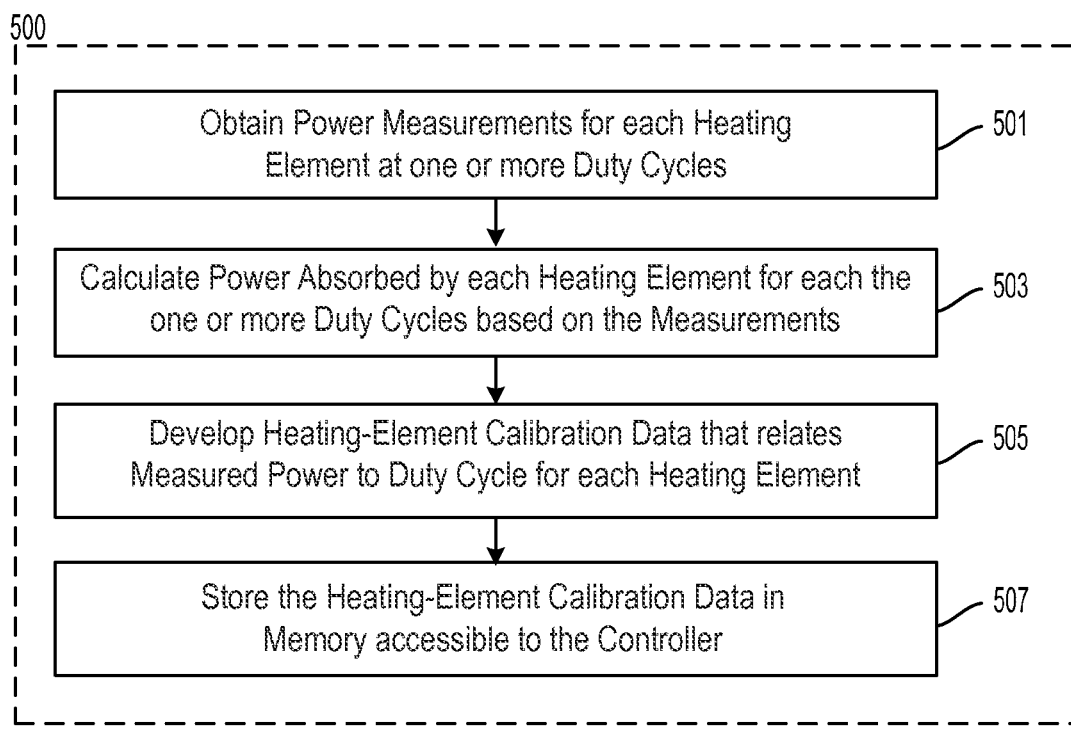
FIG. 5 depicts a block flow diagram of a method for equalizing the power delivered to a plurality of heating elements in accordance with the illustrative embodiment of the present invention.

FIG. 5 depicts method 500 for generating heating-element calibration data for each heating element to correct for differences in electrical resistance, as described above. In accordance with operation 501, power measurements are obtained for each heating element at a plurality of different duty cycles. Referring again to FIG. 3, electrical energy is delivered to power control system 312. In some embodiments, energy is directed to one heating element at a time under the control of controller 316. That is, all switches 318 other than the switch associated with the desired "active" heating element remain "open" while measurements are obtained for the one active heating element.

For example, assume controller 316 closes switch 318A while keeping all other switches open. Maintaining switch 318A in the closed position, power measurement circuitry 320 obtains the requisite measurements (e.g., voltage, current, etc.) for calculating the power delivered to heating element 210A for a duty cycle of 100 percent. The measurements required to calculate the power delivered to heating element 210A are then obtained for other duty cycles (e.g., 80%, 60%, 40%, 20%, etc.) by appropriately adjusting the amount of time that switch 318A is "open" and "closed" (per a switch cycle) while power measurement circuitry 320 obtains measurements.

This process is repeated sequentially for each of the other heating elements 210B, 210C, 210D, and 210E. In some other embodiments, controller 316 cycles through all the heating elements at a first duty cycle (e.g., 100 percent, etc.), then cycles through the heating elements at a second duty cycle (e.g., 80 percent, etc.), and so forth. In some other embodiments, rather than isolating a single heating element 210 for power measurements, measurements are obtained for two or more heating elements at a time. In such embodiments, the behavior (i.e., power versus duty cycle) of the individual heating elements is determined by comparing the measurements obtained for all pairings and by solving the resulting system of equations using well-known algebraic techniques.

In operation 503, power delivered to each heating element is calculated in the manner previously discussed. That is, power=voltage×current; or power=voltage×current×cosine of phase angle, as appropriate.

In accordance with operation 505, a mathematical expression or table that relates measured power to duty cycle (i.e., the heating-element calibration data) for each heating element 210 is generated. An example of such a table is provided below as Table II, which shows power (which would be computed from the measurements obtained in operation 501) for each heating element at various duty cycles. The power measurements at a duty cycle of 100 percent show a typical variation in power rating for heating elements nominally rated at 800 watts.

TABLE II

Measured Power as a Function of Duty Cycle
(Heating Element Calibration Data)

| Duty Cycle <%> | Measured Power <Watts> | | | | |
| --- | --- | --- | --- | --- | --- |
| | Heating Element 206A | Heating Element 206B | Heating Element 206C | Heating Element 206D | Heating Element 206E |
| 100 | 880 | 930 | 702 | 785 | 650 |
| 80 | 776 | 820 | 619 | 694 | 579 |
| 60 | 650 | 687 | 518 | 581 | 484 |
| 40 | 500 | 528 | 398 | 445 | 372 |
| 20 | 315 | 333 | 251 | 281 | 237 |

Using a look-up table such as Table II, the calibrated duty cycle for each heating element can be determined for any value of average power via simple linear interpolation. For example, if the heating elements are to be operated such that they receive 400 Watts of power, heating element 210A should have a duty cycle of 29.2%, heating element 210B should have a duty cycle of 26.9%, heating element 210C should have a duty cycle of 40.3%, heating element 210D should have a duty cycle of 34.5%, and heating element 210E should have a duty cycle of 45.0%. As used in this disclosure and the appended claims, the phrase "calibrated duty cycle" is used to refer to the duty cycle determined from the heating-element calibration data once a value for received electrical power is selected (e.g., 400 watts in the example above). It is notable that interpolating via a look-up table introduces a linearization to the process; that is, the relationship is assumed to be linear between measurement points (e.g., 20% duty cycle, 40% duty cycle, etc.).

FIG. 6 depicts the heating-element calibrated data appearing in Table II in the form of plots of measured power vs. duty cycle. For clarity, plots for only some of the heating elements (i.e., heating elements 210B, 210D, and 210E) are shown.

Using the plots in FIG. 6, the calibrated duty cycle for each of heating elements 210B, 210D, and 210E can be determined for any value of average power. For example, if the heating elements are to be operated such that they absorb 400 Watts of power, heating element 210B should have a duty cycle of 26.2%, heating element 210D should have a duty cycle of 34.0%, and heating element 210E should have a duty cycle of 44.4%. Of course, the relation between duty cycle and power must be established for all of the heating elements (e.g., 210A through 210E).

As expected, the calibrated duty cycles determined via the two methods are in agreement. The slight deviations between these two methods are a consequence of the difference between linear interpolation and non-linear nature of the data as presented in the plots. The plots are useful for pedagogical purposes here, but if such an approach is desired (rather than linear interpolation), another interpolation technique (e.g., a polynomial fit, a spline, etc.) relating duty cycle to power would be developed via a curve fit of the data (e.g., such as appears in Table II) in known fashion.

Per operation 507, the heating-element calibration data, either in the form of a look-up table or a mathematical expression, is stored in a memory that is accessible to controller 316. It is within the capabilities of those skilled in the art to organize the heating-element calibration data for use by controller 316.

The power received by heating elements 210 is measured periodically during furnace operation and the method 500 is repeated. Periodically repeating this process accounts for any aging of the heating elements, or a replacement of one or more heating elements, etc.

It was previously mentioned that even though the duty-cycle versus power relationship is non-linear, there will be little if any impact on the operation of the fusion furnace if the relationship is considered to be linear.

Referring once again to FIG. 5, during the course of operation, power measurements are obtained, per operation 501. As per operation 503, the power is calculated and the duty cycle is noted.

In accordance with operation 505, a table that relates measured power to duty cycle (i.e., the heating-element calibration data) for each heating element 210 is generated. An example of such a table is provided below as Table III, which shows power (which would be computed from the measurements obtained in operation 501) for each heating element at a single duty cycle. In this example, the measurements are taken for each heating element at a duty cycle of 60% and show the same values for power as shown in Table II:

TABLE III

Measured Power at a Duty Cycle
(Heating-Element Calibration Data)

| Duty Cycle <%> | Measured Power <Watts> | | | | |
|---|---|---|---|---|---|
| | Heating Element 206A | Heating Element 206B | Heating Element 206C | Heating Element 206D | Heating Element 206E |
| 60 | 650 | 687 | 518 | 581 | 484 |

If, as in the previous examples, the heating elements are to be operated at 400 watts, then the duty cycle for each heating element is given as a simple ratio:
Duty cycle=(desired power/measured power)×duty cycle at which power was measured. In this example, duty cycle= (400/measured power)×60%, or:
  210A: 36.9% 210B: 34.9% 210C: 46.3% 210D: 41.4% 210E: 49.6%.

Per operation 507, the heating-element calibration data of Table III is stored in a memory that is accessible to controller 316.

Correction Process for Position-Dependent Temperature Variations.

If all heating elements 210 absorb the same average amount of power as a consequence of the calibration process previously discussed, the heating elements will heat to the same temperature. Even if this were to occur, the temperature in furnace cavity 106 will not be uniform. Rather, as previously indicated, the temperature profile will exhibit a maximum temperature near the center of the cavity and lower temperatures toward the ends of the cavity due to heat-loss considerations. This phenomenon is directly analogous to the familiar situation in which a corner room of a house is cooler (when it is cold outside) than a more internally situated room, notwithstanding the fact that the heated air being delivered to the two rooms is at the same temperature. The reason for this is, of course, that the corner room has more walls exposed to the cooler ambient environment than the internally situated room. And so it is with furnace cavity 106; positions toward either the left or right end of cavity 106 will be somewhat cooler than centrally located positions, with the central position being the hottest location. As used in this disclosure and the appended claims, the phrase "position-dependent temperature variation" means a variation in temperature within the furnace cavity as a consequence of location therein due to the aforementioned heat-loss phenomenon.

Figure 7:
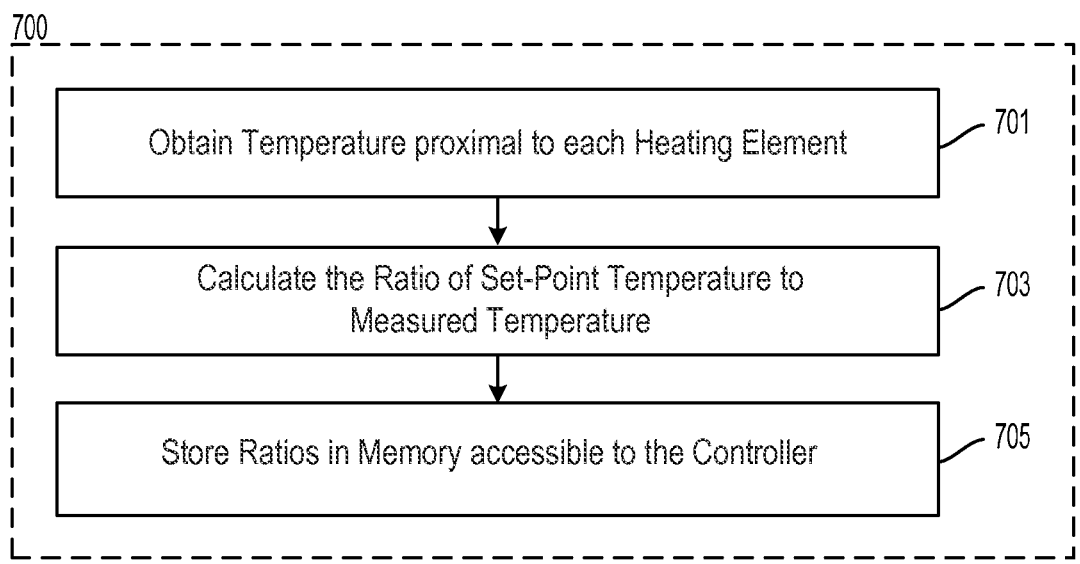
FIG. 7 depicts a block flow diagram of a method for correcting for position-dependent variations in the temperature profile of the furnace cavity.

FIG. 7 depicts method 700 for accounting for position-dependent temperature variations that occur in furnace cavity 106. In accordance with operation 701, temperature measurements are obtained at various locations in furnace cavity 106 using a movable temperature sensor (e.g., a thermocouple, etc.), which is not depicted in the drawings. Since method 700 will adjust the duty cycles of the heating elements to correct for the temperature variations, it is desirable that the temperature measurements be obtained proximal to each such heating element. It is most desirable to obtain such temperature measurements closest to the item(s) being heated in the furnace, which in the case of a fusion furnace is the crucible(s).

Thus, the temperature sensor is moved to the location where one of the crucibles will be situated during furnace operation and the temperature of furnace cavity 106 at that location is measured. That location will be closest to one of the heating elements, such as heating element 210A. The temperature sensor is then moved to the location where the next crucible will be situated and the temperature at that location is measured. That location will be closest to another of the heating elements, such as heating element 210B. The process is repeated until temperatures are obtained proximal to each crucible location. These temperature measurements are preferably performed with individual heating elements 210 operating based on the calibrated duty cycles (i.e., duty cycles corrected, in accordance with method 500, for element-to-element manufacturing variations).

Table IV below depicts illustrative temperatures across furnace cavity 106, which, in the illustrative embodiment, would be obtained as described above using a movable temperature-sensing device (i.e., thermocouple, etc.). The temperature is shown as being associated with a particular heating element, which is the heating element nearest to the crucible location. Table III shows that the temperature is likely to peak at the center of furnace cavity 106, as previously mentioned. This is particularly true for heating elements that are operating at the calibrated duty cycles (i.e., all heating elements receiving the same power). To correct this temperature profile, a second duty-cycle correction is required.

TABLE IV

Illustrative Temperature Profile Across Furnace Cavity
Temperature Near Heating Element <° C.>

| 210A | 210B | 210C | 210D | 210E |
|------|------|------|------|------|
| 1000 | 1030 | 1050 | 1030 | 1000 |

The relationship between power received and temperature rise in a steady-state closed chamber is proportional. Consequently, the correction to duty cycle is simply the ratio of desired (set-point) temperature rise to the measured temperature rise. Temperature rise is relative to ambient temperature, but, for the purposes of this illustrative description, ambient temperature is assumed to be 0° C. such that the actual temperature in degrees C. is proportional to power received. It will be clear to those skilled in the art, after reading this disclosure, how to account for different ambient temperatures. When ambient temperature is small, compared to cavity temperature (as is often the case), assuming that ambient temperature is 0° C. introduces only a small error. Assuming that the desired set-point temperature is 1050° C., the resulting correction, as per operation 703, is illustrated in Table V. It is to be understood that the corrections provided in FIG. V are for purposes of illustration only.

TABLE V

Temperature Profile of the Furnace Cavity

|  | Position Near to Heating Elements: | | | | |
|--|------|------|------|------|------|
|  | 210A | 210B | 210C | 210D | 210E |
| Uncorrected Temperature <° C.> | 1000 | 1030 | 1050 | 1030 | 1000 |
| Desired/Set-Point Temperature <° C.> | 1050 | 1050 | 1050 | 1050 | 1050 |
| Correction to "Calibrated Duty Cycle" | 1.05 | 1.03 | 1.00 | 1.03 | 1.05 |

In accordance with operation 705, the correction for position-dependent temperature variation is stored in controller 316 (i.e., stored in memory that is accessible to the microcontroller or microprocessor of controller 316).

Temperature measurements as in operation 701 might be performed, for example, in the factory, as part of initial characterization and calibration of the furnace. In some embodiments, such measurements are used for all furnaces have the same design; that is, they are not repeated for each individual furnace of the same design. They might also be performed again in the field, for example, at regular intervals as part of furnace maintenance. In normal operation, the furnace relies on thermocouple 214 for measuring cavity temperature, while relying on the correction for position-dependent temperature variation (e.g., Table IV) to achieve uniform temperature across the cavity.

It will be clear to those skilled in the art, after reading this disclosure, how to make and use embodiments of the present invention wherein a furnace comprises more than one thermocouple 214 for measuring temperature at more than one place inside the cavity, while also relying on data similar to the data of Table V for removing residual temperature differences across the cavity.

Combining the Calibration and Correction Processes.

Operation 405 of method 400 (FIG. 4) recites determining duty cycles of the heating elements. In the illustrative embodiment, this operation combines the calibration for element-to-element variations (heating-element calibration data) with the correction for position-dependent temperature variations. In the illustrative embodiment, this is accomplished by multiplying the calibrated duty cycles by the respective correction factors, yielding "corrected, calibrated duty cycles."

For example, in a previous illustrative example, it was determined that if the heating elements are to be operated such that they absorb 400 Watts of power, which is intended to result in a heating element temperature of 1050° C., heating element 210A should have a 29.2% duty cycle, heating element 210B should have a duty cycle of 26.9%, heating element 210C should have a duty cycle of 40.3%, heating element 210D should have a duty cycle of 34.5%, and heating element 210E should have a duty cycle of 45.0%. These calibrated duty cycle values were obtained by linear interpolation of the heating-element calibration data appearing in Table II. The calibrated duty cycles can then be corrected for position-dependent temperature variation by multiplying them by the correction factors from Table V.

Thus, the calibrated duty cycle values for respective heating elements 210A, 210B, 210C, 210D, and 210E are multiplied by 1.05, 1.03, 1.00, 1.03, and 1.05 to correct for position-dependent temperature variations. This process is summarized in Table VI.

TABLE VI

Duty Cycle Corrected for Resistance Variations and Position-Dependent Variations

|  | Heating Elements | | | | |
|--|------|------|------|------|------|
|  | 210A | 210B | 210C | 210D | 210E |
| Calibrated Duty Cycle | 29.2% | 26.9% | 40.3% | 34.5% | 45.0% |
| Correction factor | 1.05 | 1.03 | 1.00 | 1.03 | 1.05 |
| Corrected, Calibrated Duty Cycle | 30.7% | 27.7% | 40.3% | 35.5% | 47.3% |

In some embodiments, the correction factors are determined for a representative furnace and are then used for other units (i.e., the correction factors are stored at the time of manufacture in controller-accessible memory of furnaces having the same design). In some other embodiments, a further refinement of correction factors is performed. In particular, controller 316 generates control signals for switches 318 to implement the "corrected, calibrated duty cycles" for heating elements 210 based on an initial set of values as in Table VI. The position-by-position temperature measurements are then repeated and further (smaller) corrections to the heating-element duty cycles are obtained. This process can be repeated, if desired, until the positions exhibit near-identical temperatures.

The temperature profile in the furnace results from heat transfer to the ambient environment, which is a function of the temperature differential across the walls of the furnace. There are protocols that require the furnace to be operated at substantially lower temperatures than 1000° C. For example, certain fluxes require the temperature in furnace cavity 106 to be ramped with dwell periods at several hundred degrees centigrade. The relationship of the peak temperature to the coolest temperatures across furnace cavity might be somewhat different when furnace cavity is at several hundred degrees centigrade than when it is at 1000° C. Therefore, the correction to heating-element duty cycle for position-dependent temperature variation should be obtained at a variety of different temperatures (i.e., for the temperatures required by the various protocols for different fluxes, etc.) if such differences are to be avoided.

In the illustrative embodiment, the temperature profile in furnace cavity 106 is obtained from actual temperature measurements using a movable temperature sensor. In some other embodiments, however, the temperatures can be obtained via numerical analysis using heat transfer equations. Such calculations are likely to have a 10 to 20 percent margin of error as compared to the measured values.

Controller 316 is thus able to implement a feedback control loop by individually controlling the duty cycles of each heating element 210, as corrected for electrical resistance variations from a nominal rating and as corrected for position-dependent temperature variation within furnace cavity 106 due to heat transfer mechanisms.

Figure 8:
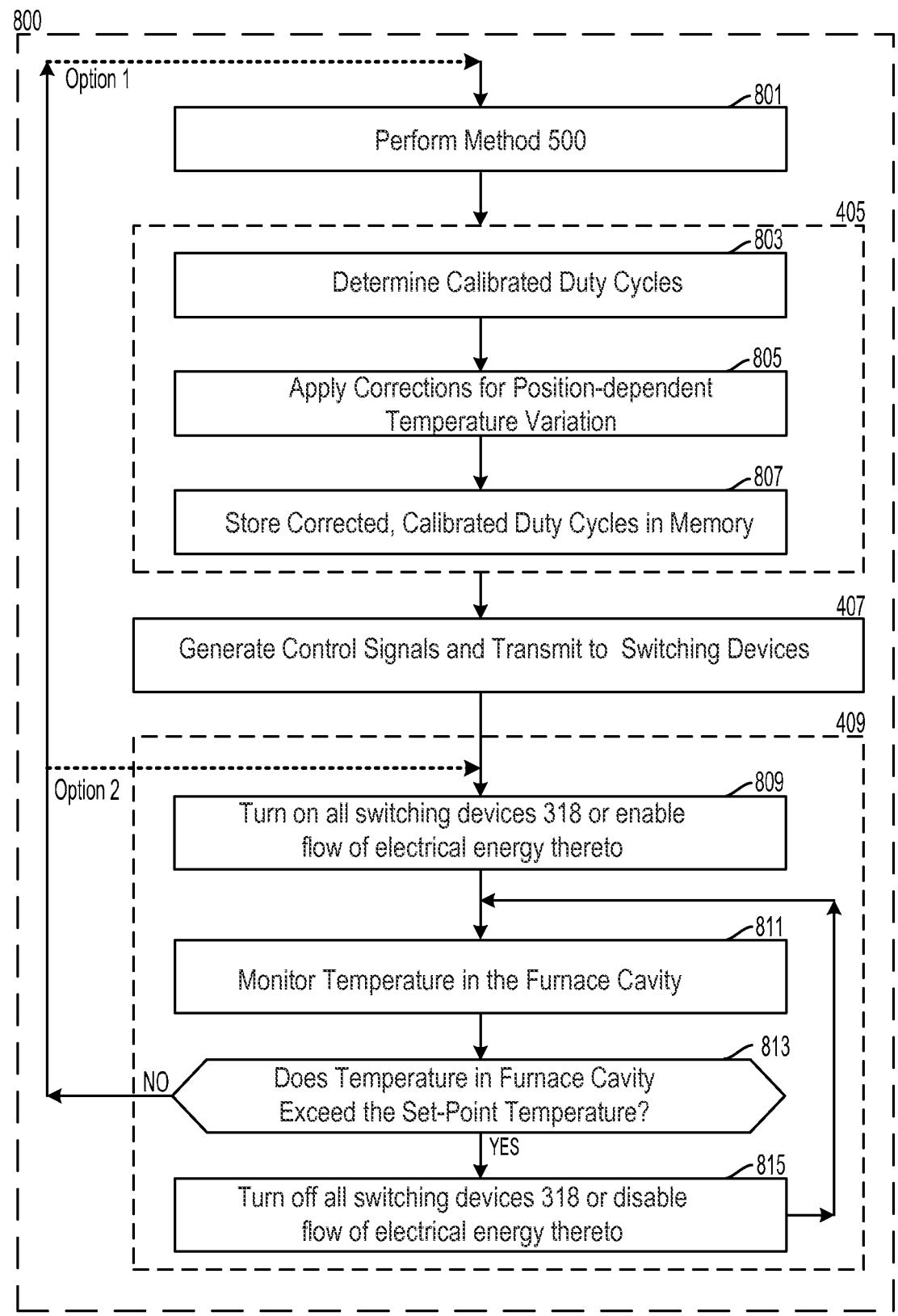
FIG. 8 depicts a block flow diagram of a temperature control loop in accordance with an illustrative embodiment of the present invention.

FIG. 8, which is based on FIG. 4, depicts method 800, which provides further detail about the temperature feedback loop and depicts several ways in which the duty-cycle calibration and correction processes are incorporated therein.

In accordance with operation 801, heating-element calibration data is obtained for each heating element in accordance with method 500.

Operation 405 of method 400 is implemented as sub-operations 803 through 807 of method 800. At operation 803, based on a desired (uniform) operating power for the heating elements, the calibrated duty cycles are determined from the heating-element calibration data (in the form of a table or mathematical expression) developed in operation 801. At operation 805, the correction for position-dependent temperature variation in the furnace cavity is applied to the calibrated duty cycles. The corrected, calibrated duty cycles are then stored in memory at operation 807.

In operation 407, controller 316 generates control signals based on the corrected, calibrated duty cycles and transmits the signals to the switching devices 318. Notwithstanding operation 407, the temperature feedback loop, which is implemented at operation 409, controls (on an on-going basis) whether the heating elements are receiving power. In particular, in the illustrative embodiment, controller 316 must explicitly enable transmission of the control signals and can later disable and re-enable transmission as needed. Disabling the transmission results in all switches 318 being turned "off" (open) and remaining in the "off" state until transmission of signals is re-enabled. If transmission is not enabled, power will not be received by the heating elements. In some alternative embodiments, the same result is achieved by incorporating a master switch that controls the flow of electrical energy to all switches 318 (see, e.g., FIG. 10 and the accompanying discussion). In such embodiments, controller 316 closes or opens the master switch, thereby enabling or disabling the flow of electrical energy to switches 318 (even though, in at least some embodiments, the switches continue to open and close in accordance with the corrected, calibrated duty cycles). If electrical energy does not flow to switches 318, then power is not received by the heating elements.

Operation 409 includes sub-operations 809 through 815. In operation 809, all switches 318 are turned "on;" that is, they are enabled to receive the control signals generated in operation 407. In operation 811, the master temperature sensor (thermocouple 214 in the illustrative embodiment) obtains a temperature reading of furnace cavity 106 and transmits a signal indicative thereof to controller 316. Query, at 813, whether the temperature in furnace cavity 106 exceeds the set-point temperature. If it does, at operation 815, controller 316 turns off power to all heating elements 210 by opening switches 318 (or a separate master switch, if present). Then, another temperature reading is obtained at operation 811. As long as the measured temperature exceeds the set-point temperature, power to all heating elements remains "off." In this fashion, the temperature control loop (operation 409) gates the switch cycling that otherwise occurs to achieve the requisite duty cycle (operations 405, 407). If, however, the temperature does not exceed the set-point temperature, processing loops back either to operation 801 (option 1) or to operation 809 (option 2).

In option 1, method 500 for obtaining heating-element calibration data is performed again and is part of the control loop. In option 2, controller 316 accesses the previously determined corrected, calibrated duty cycles at operation 807. Option 1 might be optionally performed at regular time intervals to keep the values of the corrected, calibrated duty cycles up to date. Option 1 would be required, for example, when a heating element is replaced, especially if the new heating element is made of a different material than the replaced heating element. Alternatively, option 1 can be performed on an essentially continuous basis.

Operation 813 might also include a brief dwell (delay) time (e.g., 1 to 5 seconds, etc.) as needed to prevent excessively loop cycling.

Figure 9A:
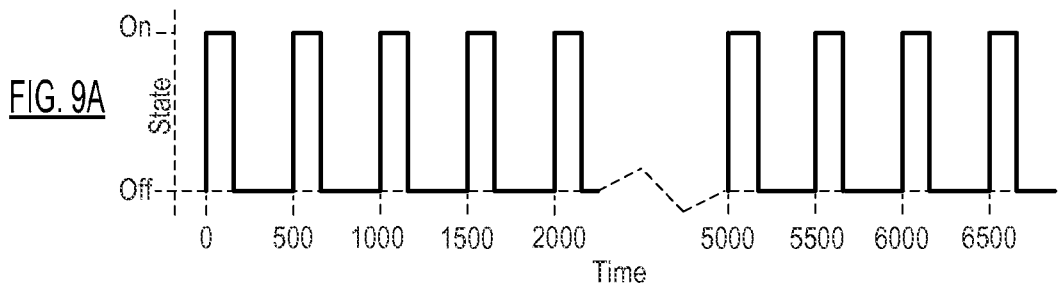
FIGS. 9A and 9B depicts the state of two switches versus time in accordance with two duty cycles.
Figure 9B:
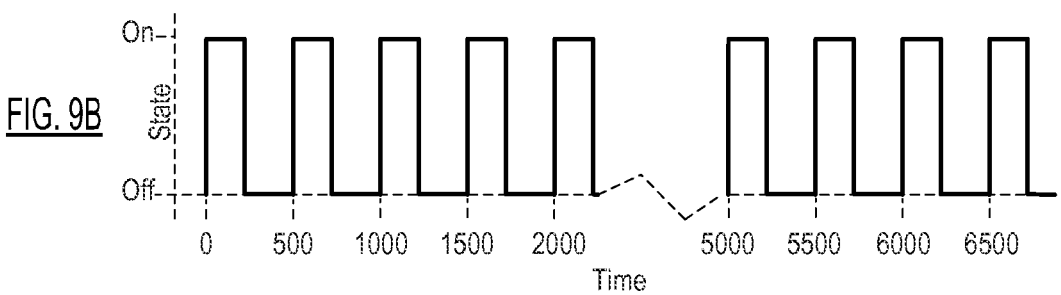
Figure 9C:
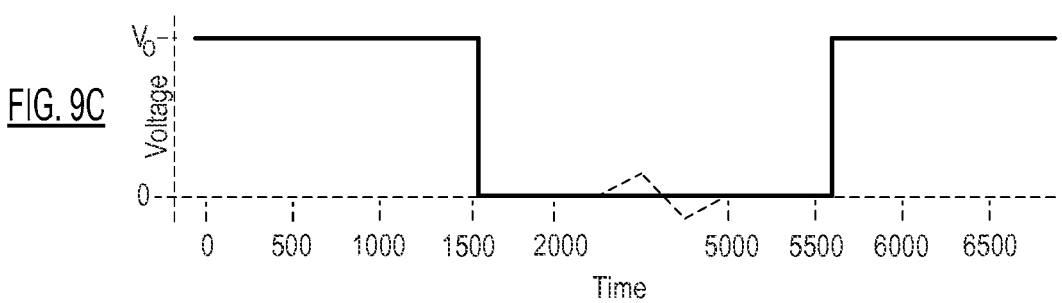
FIG. 9C depicts a plot of voltage versus time that illustrates the control of electrical energy in the power-control system consistent with temperature monitoring via the temperature control loop.
Figure 9D:
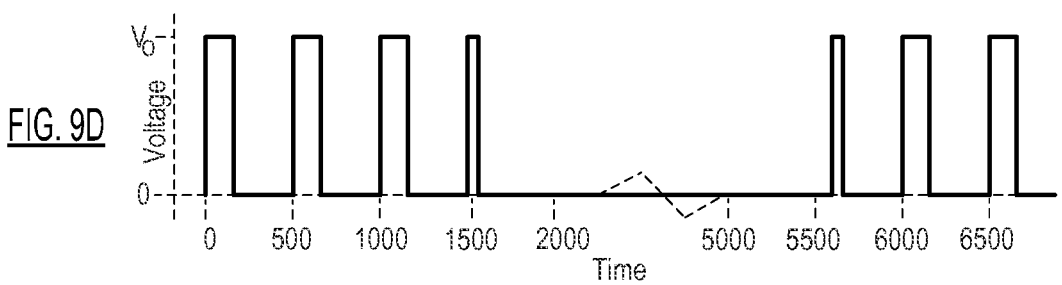
FIGS. 9D and 9E depicts a superposition of plots 9A and 9C and a superposition of plots 9B and 9C, respectively.
Figure 9E:
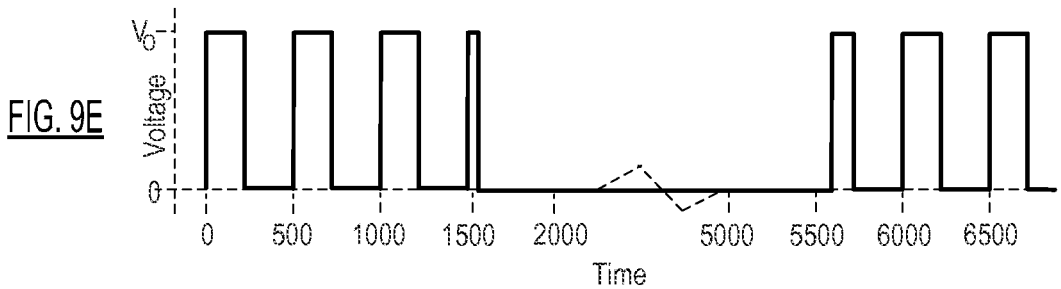

FIGS. 9A through 9E illustrate the nature of the interaction between the duty-cycle control, as implemented by operations 405 and 407, and the temperature control loop, as implemented by operation 409. In particular, FIGS. 9D and 9E show how the temperature control loop gates the corrected, calibrated duty cycles as necessary to maintain set-point temperature.

Figure 10:
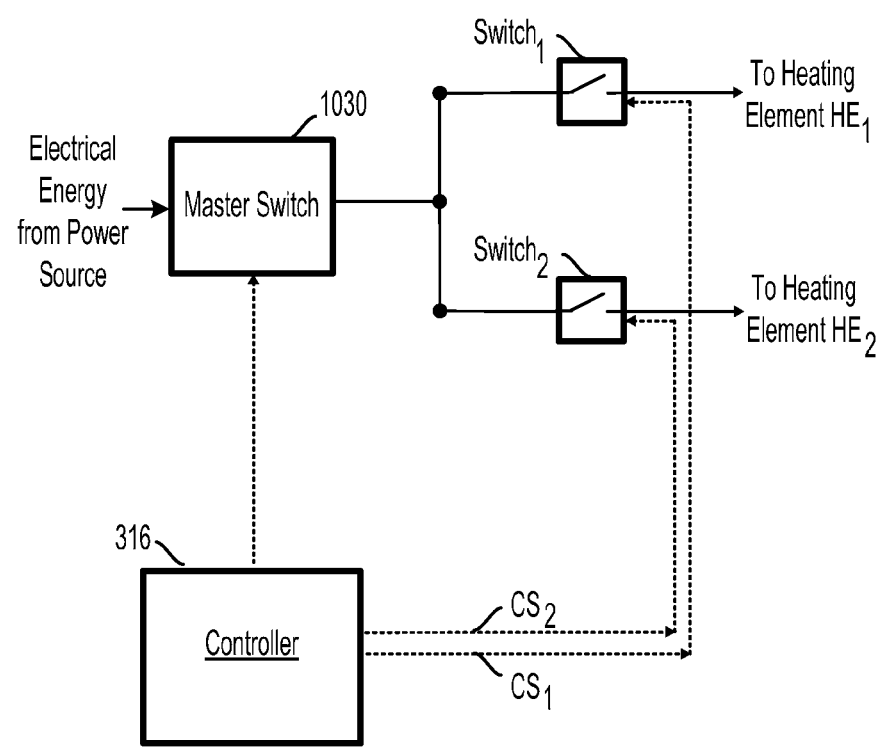
FIG. 10 depicts a simplified illustration of a power control system in accordance with the present teachings.

FIG. 10 depicts a simplified power control system in accordance with the present teachings for reference in conjunction with the discussion of FIGS. 9A through 9E. The power control system depicted in FIG. 10 includes controller 316, master switch 1030, and switches $Switch_1$ and $Switch_2$. Those skilled in the art will recognize that the functionality of master switch 1030 can be implemented in the absence of such a master switch by controller 316 (such as via operations 809 and 815 of method 800).

FIG. 9A is a plot that depicts the state—"on" or "off"—of a first switch (such as $Switch_1$) consistent with the determination and implementation of a corrected, calibrated duty cycle such as results from operations 405 and 407 of FIGS. 4 and 8. FIG. 9B is a plot that depicts the state—"on" or "off"— of a second switch (such as $Switch_2$) per operations 405 and 407.

The plots depicted in FIGS. 9A and 9B are based on a counter that is used to continuously cycle the switches on 500 millisecond (ms) periods. In various embodiments, this period can be less than or greater than 500 milliseconds; typically, the period will be in a range of about 100 milliseconds to about 1 second, and more preferably in a range of about 250 ms to 750 ms. As previously mentioned, it is preferable that the period of the counter is faster than the thermal inertia of a typical heating element so that the temperature of heating elements can be assumed to be unaffected by the cycling of switches to attain the desired duty cycle. For clarity of illustration, FIGS. 9A and 9B depict switches $Switch_1$ and $Switch_2$ cycling "on" at the same time. As previously discussed, the "on" times for the switches are preferably staggered in some manner to avoid what would otherwise be a relatively large power draw from the power source as the switches turn "on" at the same time.

With respect to the plot shown in FIG. 9A, control signal $CS_1$ generated by controller 316 cycles first switch Switch$_1$ to provide a duty cycle of about 30 percent for associated heating element HE$_1$. Thus, in each period of 500 ms, the first switch is closed for about 30 percent of the time (150 ms) and open for about 70 percent of the time (350 ms). With respect to FIG. 9B, control signal $CS_2$ generated by controller 316 cycles second switch Switch$_2$ to provide a duty cycle of about 45 percent for associated heating element HE$_2$. Therefore, for each period of 500 ms, the second switch is closed 45 percent of the time (225 ms) and open for about 55 percent of the time (275 ms).

FIG. 9C depicts, via a plot of voltage versus time in milliseconds, an illustration of the temperature-control loop implemented by operation 409. As long as the temperature within the furnace cavity is below the set-point temperature, master switch 1030 is "closed" such a constant amount of that electrical energy ($V_o$) flows to switches Switch$_1$ and Switch$_2$. In the illustration depicted in FIG. 9C, master switch 1030 is closed until Time=1563 ms, at which time it opens with the result that electrical energy stops flowing to switches Switch$_1$ and Switch$_2$. At Time=5600 ms, master switch 1030 closes and electrical energy again flows to switches Switch$_1$ and Switch$_2$.

FIG. 9D depicts the superposition of FIG. 9A (state of switch Switch$_1$) and FIG. 9C, thereby showing when power is being received by heating element HE$_1$. With switch Switch$_1$ cycling to achieve the corrected, calibrated duty cycle (30%) for heating element HE$_1$ (per FIG. 9A) and with electrical energy flowing through master switch 1030 until Time=1563 ms and then again beginning at Time=5600 ms (per FIG. 9C), power is received by heating element HE$_1$ for the following periods of time: 0 to 150 ms; 500 to 550 ms; 1000 to 1150 ms; 1500 to 1563 ms; 5600 to 5650 ms; 6000 to 6150 ms, 6500 to 6650 ms, and so forth.

FIG. 9E depicts the superposition of FIG. 9B (state of switch Switch$_2$) and FIG. 9C, thereby showing when power is being received by heating element HE$_2$. With switch Switch$_2$ cycling to achieve the corrected, calibrated duty cycle (45%) for heating element HE$_2$ (per FIG. 9B) and with electrical energy flowing through master switch 1030 until Time=1563 ms and then again beginning at Time=5600 ms (per FIG. 9C), electrical energy flows to heating element HE$_2$ for the following periods of time: 0 to 225 ms; 500 to 725 ms; 1000 to 1225 ms; 1500 to 1563 ms; 5600 to 5725 ms; 6000 to 6225 ms, 6500 to 6725 ms, and so forth.

It will be understood that in the absence of master switch 1030, in some embodiments, controller 316 would simply not enable switches Switch$_1$ and Switch$_2$ when master switch 1030 would otherwise be open, such that the plots showing the state of switches (FIGS. 9A and 9B) would look like FIGS. 9D and 9E, respectively.

In the illustrative examples presented above, it has often been assumed that the average power received by a heating element is proportional to the duty cycle, as long as other parameters such as voltage and resistance of the heating element remain unchanged. This assumption is largely correct if a DC power source is used; however, with an AC power source, one must consider the interaction between the duty cycle of the switching elements and the cycles of the AC. In general, if a switching element stays "on" for a period of time that is an integer multiple of half a period of the AC, then the AC power source will be equivalent to a DC power source; otherwise, the sinusoidal waveform of the AC power will be disrupted by truncation.

Disruption from the nominal sinusoidal shape of an AC waveform is often characterized by computing an equivalent phase angle different from zero degrees. In more complex cases, a more detailed analysis might be required. For example, if the switching element is a thyristor or a TRIAC, it might be used in a mode similar to how such devices are used in typical light dimmers, wherein the device is switched "on" and "off" in synchrony with the cycles of the AC. In such cases, a more detailed analysis of how the duty cycle interacts with the AC is needed. It will be clear to those skilled in the art how to perform such analysis. Also, the measurement of electrical power received by a heating element requires different calculations in such cases. It will be clear to those skilled in the art how to perform such calculations.

Although FIG. 3 depicts heating elements connected in parallel, embodiments of the present invention are possible wherein the heating elements are connected in series (or wherein a combination of elements connected in parallel and series is used). There is a symmetry between parallel and series connections: replace the voltage source with a current source, and replace the series switches with shunt switches wherein a switch must be closed in order to turn off the corresponding heating element. With such replacements, the techniques taught in this disclosure can be easily modified to achieve embodiments wherein the heating elements are connected in series.

Even if a current source is not available, embodiments of the present invention are possible with a voltage source and heating elements connected in series with shunt switches, as long as appropriate corrections are applied to account for the fact that, when one heating element is turned "off" by closing the associated shunt switch, the power received by the remaining heating element increases and an appropriate duty-cycle correction must be applied to account for such increase. It will be clear to those skilled in the art, after reading this disclosure, how to determine and apply such correction.

Although the illustrative examples presented above are based on a single temperature set point, it will be clear to those skilled in the art how to make and use embodiments of the present invention wherein other temperature-control techniques are used. In particular, it is often common to have hysteresis in the control technique. For example, a controller with hysteresis might have two temperature set points, separated by a small difference. Such a controller might turn on the heating elements when the temperature dips below the lower set point, and turn off the heating elements when the temperature rises above the higher set point.

In some embodiments, a model is used that relates the temperature offset (i.e., the difference between the measured temperature in furnace cavity 106 and the set-point temperature) to a required change in received power. Such models are well known and it is within the capabilities of those skilled in the art to develop and/or specify such models for use in conjunction with embodiments of the present invention. For example, a PID control model might be used. In such embodiments, controller 316 uses the model to determine the change required in the power delivered to heating elements 210A through 210E to bring the temperature offset to zero. In some such embodiments, controller 316 generates control signals that appropriately alter the duty cycle at which switches 318A through 318E are otherwise cycled, thereby altering the duty cycles of the heating elements (from what was determined/implemented via operations 405 and 407) so as to achieve the desired increase or decrease in temperature. In embodiments in which the furnace includes a master switch, controller 316 might also generate a control signal that appropriately cycles the master switch (effectively altering the duty cycles of heating elements 210A through 210E) as necessary to decrease the temperature offset to zero.

It is to be understood that the disclosure describes a few embodiments and that many variations of the invention can easily be devised by those skilled in the art after reading this disclosure and that the scope of the present invention is to be determined by the following claims.

What is claimed:

1. A power-compensated fusion furnace comprising:
   a furnace cavity including a door;
   a plurality of electrical heating elements electrically coupled in parallel configurations, wherein at least some of the electrical heating elements have a different electrical resistance from other of the electrical heating elements;
   a power control system that independently controls an electrical duty cycle of each of the plurality of electrical heating elements to account for the different electrical resistance thereof by turning the electrical heating elements on or off to achieve a uniform temperature across the furnace cavity, wherein the electrical duty cycle of at least one electrical heating element in the plurality thereof differs from the electrical duty cycle of other electrical heating elements in the plurality; and
   wherein the power control system comprises:
   a thermocouple;
   a plurality of electrical switches, wherein each switch is electrically coupled to a respective electrical heating element of the electrical heating elements in series configuration to control a respective flow of electrical energy thereto based on a temperature measurement by the thermocouple;
   a power measurement circuitry electrically coupled to each switch of the plurality of electrical switches, wherein the power measurement circuit is configured to measure electrical power delivered to each of the electrical heating elements; and
   a controller configured to generate and transmit, to each switch, a first control signal that causes said each switch to implement the electrical duty cycle of the respective electrical heating element based at least on the measured electrical power delivered to each of the electrical heating elements and a curve fit of calibration data using a polynomial or a spline.

2. The power-compensated fusion furnace of claim 1, wherein the controller accesses heating-element calibration data.

3. The power-compensated fusion furnace of claim 2, wherein the controller accesses correction factors for position-dependent temperature variations in the furnace cavity.

4. The power-compensated fusion furnace of claim 3, wherein the controller determines a corrected, calibrated duty cycle based on: (i) a desired and uniform amount of power to be delivered to each heating element; (ii) the heating-element calibration data; and (iii) the correction factors.

5. The power-compensated fusion furnace of claim 1, wherein the power measurement circuitry is configured to obtain measurements used to determine calibration data for each heating element, and wherein the controller accesses the calibration data.

6. The power-compensated fusion furnace of claim 5, wherein the controller accesses correction factors for position-dependent temperature variations in the furnace cavity.

7. The power-compensated fusion furnace of claim 1, wherein the electrical duty cycle for each heating element is altered by a second control signal that is generated and transmitted by the controller, wherein the second control signal causes a cessation in the respective flow of electrical energy to the plurality of heating elements.

8. The power-compensated fusion furnace of claim 7, wherein the controller generates the second control signal when a measured temperature in the furnace cavity exceeds a desired temperature in the furnace cavity.

9. The power-compensated fusion furnace of claim 7, further comprising a master switch, wherein the master switch controls the flow of the electrical energy to the plurality of electrical switches, and wherein, when the master switch receives the second control signal, said master switch disables the flow of electrical energy to the plurality of electrical switches.

10. The power-compensated fusion furnace of claim 7, wherein the second control signal is received by each of the plurality of electrical switches.

11. The power-compensated fusion furnace of claim 7 wherein, responsive to the second control signal, the respective flow of electrical energy ceases for more than 1 second.

12. The power-compensated fusion furnace of claim 1, wherein to implement the electrical duty cycles for the plurality of heating elements, each switch remains closed for a first portion of a counter period and remains open for a second portion of the counter period.

13. The power-compensated fusion furnace of claim 12, wherein the counter period is less than 1 second.

14. The power-compensated fusion furnace of claim 12, wherein the counter period is in a range of about 250 to 750 milliseconds.

15. The power-compensated fusion furnace of claim 12, wherein the first portion of the counter period is less than the second portion of the counter period.

16. A power-compensated furnace, comprising:
    a furnace cavity;
    a plurality of electrical heating elements; and
    a power control system that independently provides electrical energy of a plurality of electrical energies to each electrical heating element of the plurality of electrical heating elements by adjusting a duty cycle of a plurality of duty cycles each duty cycle associated with a respective electrical energy of the plurality of electrical energies, wherein a first duty cycle of a first electrical energy of the plurality of electrical energies differs from a second duty cycle of a second electrical energy of the plurality of electrical energies, the power control system includes:
    a plurality of electrical switches each electrical switch coupled to each electrical heating element of the plurality of electrical heating elements in series configuration to control the respective electrical energy of the plurality of electrical energies based on a temperature measured by a thermocouple;
    a power measurement circuitry electrically coupled to each electrical switch of the plurality of electrical switches, wherein the power measurement circuit is configured to measure electrical power delivered to each of the electrical heating elements; and
    a controller configured to transmit a control signal of a plurality of control signals to each electrical switch of the plurality of electrical switches to control the plurality of duty cycles based at least on the measured electrical power delivered to each of the electrical heating elements and a curve fit of calibration data using a polynomial or a spline.

17. The power-compensated furnace of claim 16, further comprising the thermocouple configured to measure the temperature.

18. The power-compensated furnace of claim 16, wherein the controller is further configured to determine the plurality of control signals based on the plurality of duty cycles.

19. The power-compensated furnace of claim 18, wherein the controller is further configured to determine the plurality of duty cycles based on at least one of calibration data of the plurality of electrical heating elements and correction factors for temperature variations in the furnace cavity.

20. The power compensated furnace of claim 16, wherein the power measurement circuitry is configured to obtain measurements associated with calibration data of the plurality of electrical heating elements.

21. The power compensated furnace of claim 16, wherein the controller is configured to transmit a first control signal to a first electrical switch to allow a first electrical energy to flow to a first electrical heating element and a second control signal to the first electrical switch to stop the first electrical energy to flow to the first electrical heating element.

22. The power compensated furnace of claim 21, wherein the power control system is further configured to, for each electrical heating element of the plurality of electrical heating elements:
  obtain a plurality calibration power measurements associated a plurality of calibration duty cycles;
  calculate power absorbed by each electrical heating element for each calibration duty cycle of the plurality of calibration duty cycles based on the plurality of calibration power measurements; and
  generating calibration data based on the calculated power and the plurality of calibration duty cycles.

23. The power compensated furnace of claim 16, wherein the controller comprises memory for storing calibration data or correction factors.

* * * * *